(12) United States Patent
Beck

(10) Patent No.: US 8,126,701 B2
(45) Date of Patent: Feb. 28, 2012

(54) TRANSLATION TECHNOLOGY IN ELECTRONIC SOURCING

(75) Inventor: Matthew Beck, Duquesne, PA (US)

(73) Assignee: Ariba, Inc., Sunnyvale, CA (US)

( * ) Notice: Subject to any disclaimer, the term of this patent is extended or adjusted under 35 U.S.C. 154(b) by 1940 days.

(21) Appl. No.: 10/355,562

(22) Filed: Jan. 31, 2003

(65) Prior Publication Data

US 2004/0153310 A1     Aug. 5, 2004

(51) Int. Cl.
*G06F 17/28* (2006.01)
*G06F 17/20* (2006.01)
*G10L 11/00* (2006.01)
*G06F 17/27* (2006.01)
*G10L 21/00* (2006.01)

(52) U.S. Cl. ............... 704/8; 704/2; 704/9; 704/270; 704/277

(58) Field of Classification Search .......... 704/2, 3, 704/7; 370/338, 401, 328, 349; 709/220
See application file for complete search history.

(56) References Cited

U.S. PATENT DOCUMENTS

| | | |
|---|---|---|
| 3,581,072 A | 5/1971 | Nymeyer |
| 3,863,060 A | 1/1975 | Rode et al. |
| 4,597,045 A | 6/1986 | Kiuchi |
| 4,674,044 A | 6/1987 | Kalmus et al. |
| 4,789,928 A | 12/1988 | Fujisaki |
| 4,799,156 A | 1/1989 | Shavit et al. |
| 4,845,625 A | 7/1989 | Stannard |
| 4,992,940 A | 2/1991 | Dworkin |
| 5,136,501 A | 8/1992 | Silverman et al. |
| 5,193,056 A | 3/1993 | Boes |
| 5,243,515 A | 9/1993 | Lee |
| 5,297,032 A | 3/1994 | Trojan et al. |
| 5,375,055 A | 12/1994 | Togher et al. |
| 5,394,324 A | 2/1995 | Clearwater |
| 5,402,336 A | 3/1995 | Spiegelhoff et al. |
| 5,442,782 A * | 8/1995 | Malatesta et al. ............ 1/1 |
| 5,606,602 A | 2/1997 | Johnson et al. |
| 5,629,982 A | 5/1997 | Micali |
| 5,640,569 A | 6/1997 | Miller et al. |
| 5,664,115 A | 9/1997 | Fraser |
| 5,684,963 A | 11/1997 | Clement |

(Continued)

FOREIGN PATENT DOCUMENTS

EP     0399850 A     11/1990

(Continued)

OTHER PUBLICATIONS

Andrews, "Auctions Catch the Interest of Hobbyists and Big Business", Aug. 24, 1998.

(Continued)

*Primary Examiner* — Justin Rider
(74) *Attorney, Agent, or Firm* — Van Pelt, Yi & James LLP

(57) ABSTRACT

A method for providing effective communication in a network, including obtaining from an editor data in a first language, accepting from the editor at least one allowable language other than the first language, receiving a request from a reader to access the data in a second language, if the second language is the at least one allowable language, rendering a version of the data in the second language to the reader, and if the second language is not the at least one allowable language, providing the data to the reader in the first language.

18 Claims, 10 Drawing Sheets

U.S. PATENT DOCUMENTS

| | | | |
|---|---|---|---|
| 5,689,652 | A | 11/1997 | Lupien et al. |
| 5,715,402 | A | 2/1998 | Popolo |
| 5,727,165 | A | 3/1998 | Ordish et al. |
| 5,758,327 | A | 5/1998 | Gardner et al. |
| 5,758,328 | A | 5/1998 | Giovannoli |
| 5,765,138 | A | 6/1998 | Aycock et al. |
| 5,774,873 | A | 6/1998 | Berent et al. |
| 5,794,207 | A | 8/1998 | Walker et al. |
| 5,794,219 | A | 8/1998 | Brown |
| 5,797,127 | A | 8/1998 | Walker et al. |
| 5,799,151 | A | 8/1998 | Hoffer |
| 5,799,285 | A | 8/1998 | Klingman |
| 5,802,502 | A | 9/1998 | Gell et al. |
| 5,803,500 | A | 9/1998 | Mossberg |
| 5,809,483 | A | 9/1998 | Broka et al. |
| 5,826,244 | A | 10/1998 | Huberman |
| 5,832,496 | A | 11/1998 | Anand et al. |
| 5,835,896 | A | 11/1998 | Fisher et al. |
| 5,862,223 | A | 1/1999 | Walker et al. |
| 5,890,138 | A | 3/1999 | Godin et al. |
| 5,897,621 | A | 4/1999 | Boesch et al. |
| 5,905,974 | A | 5/1999 | Fraser et al. |
| 5,905,975 | A | 5/1999 | Ausubel |
| 5,915,209 | A | 6/1999 | Lawrence |
| 5,966,699 | A | 10/1999 | Zandi |
| 6,014,627 | A | 1/2000 | Togher et al. |
| 6,021,398 | A | 2/2000 | Ausubel |
| 6,023,685 | A | 2/2000 | Brett et al. |
| 6,044,363 | A | 3/2000 | Mori et al. |
| 6,055,518 | A | 4/2000 | Franklin et al. |
| 6,058,379 | A | 5/2000 | Odom et al. |
| 6,061,663 | A | 5/2000 | Bloom et al. |
| 6,078,906 | A | 6/2000 | Huberman |
| 6,119,229 | A | 9/2000 | Martinez et al. |
| 6,151,589 | A | 11/2000 | Aggarwal et al. |
| 6,154,720 | A * | 11/2000 | Onishi et al. ............ 704/2 |
| 6,161,099 | A | 12/2000 | Harrington et al. |
| 6,199,050 | B1 | 3/2001 | Alaia et al. |
| 6,266,652 | B1 | 7/2001 | Godin et al. |
| 6,275,807 | B1 | 8/2001 | Schirripa |
| 6,366,891 | B1 | 4/2002 | Feinberg |
| 6,623,529 | B1 * | 9/2003 | Lakritz ............ 709/218 |
| 7,085,740 | B1 * | 8/2006 | Meyers ............ 705/37 |
| 2001/0032175 | A1 * | 10/2001 | Holden et al. ............ 705/37 |
| 2002/0111787 | A1 * | 8/2002 | Knyphausen et al. ............ 704/2 |
| 2002/0156688 | A1 * | 10/2002 | Horn et al. ............ 705/26 |
| 2002/0174196 | A1 * | 11/2002 | Donohoe et al. ............ 709/219 |
| 2002/0193983 | A1 * | 12/2002 | Tokieda et al. ............ 704/2 |

FOREIGN PATENT DOCUMENTS

| | | |
|---|---|---|
| WO | WO 92/15174 | 9/1992 |
| WO | WO 97/37315 | 10/1997 |
| WO | WO 98/34187 | 8/1998 |
| WO | WO 99/63461 | 12/1999 |

OTHER PUBLICATIONS

Associated Press, "Auction on Web is Buyer's Market", Apr. 6, 1998.

"BroadVision Developing First Interactive Commerce Management System to Support Online Sales & Marketing Process; New Software Category Necessary to Interactive Network Architecture", Business Wire, p50152, May 15, 1995.

Danny Cohen, "Computerized Commerce", Information Processing 89, Aug. 28-Sep. 1, 1989.

"FairMarket Launches New Self-Serve Auctions", Business Wire, p6161495, Jun. 16, 1998.

Jahnke, "How Bazaar", CIO Web Business Magazine, Aug. 27, 1998.

Jean-Pierre Banatre, et al., "The Design and Building of Enchere, a Distributed Electronic Marketing System" Communications of the ACM, No. 1, Jan. 29, 1986.

Lee, "Do electronic marketplaces lower the price of goods?", Communications of the PCM, v41n1 pp. 73-80, Jan. 1998.

Malone, et al., "The Logic of Electronic Markets", Harvard Business Review, No. 893II, May-Jun. 1989.

"Moai Technologies Introduces New categories of Business to Business Auction Software . . . ", Business Editors and Computer Writers, Mar. 16, 1998.

Kikuchi, et al., "Multi-Round Anonymous Auction Protocols", IEICE Trans. Inf. & Syst., vol. E82-D, No. 4, Apr. 1999.

"Online bidding software", Electronic Buyers' News, Issue 1072, p. 86, 1/6p, Aug. 25, 1997.

Sairamesh, et al., "Economic Framework for Pricing and Charging Digital Libraries", D-Lip Magazine, Feb. 1996.

"Sold!. . . To the Lowest Bidder", Computer Finance, v6, n2, Jul. 1995.

"Venture Capitalists Fund Two Massachusetts Internet Related Companies", Boston Globe, Jan. 14, 1998.

Vigoroso, "Buyers prepare for brave new world of e-commerce", Purchasing, v126, n6, pS4(1), Apr. 22, 1999.

Von der Fehr, et al., "Predatory bidding in sequential auctions", Oxford Economics Papers, v46, n3, p345(12), Jul. 1994.

"What you need to know to bid in FCC's narrowband auction", Washington Telecom News, v2, n26, p6(2), Jun. 27, 1994.

Wilder, "What's Your Bid?—FreeMarkets' real-time online bidding technology lets clients drive downcosts and improve product value", InformationWeek, Nov. 10, 1997.

Woolley, "E-muscle", Forbes, Mar. 9, 1998.

M. Reck, "Types of Electronic Auctions", Hochschule St. Gallen.

C. Wrigley, "Design Criteria for Electronic Market Servers", Electronic Markets, vol. 7, No. 4, 1997.

Wurman, et al., "The Michigan Internet AuctionBot: A Configurable Auction Server for Human and Software Agents", Artificial Intelligence Laboratory, University of Michigan, 1998.

* cited by examiner

FIG. 3D

- 130: Browser window — FREEMARKETS QUICKSOURCE - MICROSOFT INTERNET EXPLORER
- Address: HTTPS://MYQUICKSOURCE.COM/FMKT/EN_US/BUYERBUILDREVIEWAUCTION.ASP?CBEGUID={693C5651-6007-4EED-A877-D6A2141CCBDF}

131 — AUCTION DETAILS     EDIT SECTION

- AUCTION TITLE: A SECOND AUCTION FOR HATS — 132
- AUCTION DESCRIPTION: VARIOUS TYPES OF HATS AND CAPS
- BIDDING FORMAT: REVERSE
- START DATE AND TIME: 06/21/2003 12:00 PM (UNITED STATES :: PENNSYLVANIA)
- END DATE AND TIME FOR FIRST LOT: 06/28/2003 12:00 PM (UNITED STATES :: PENNSYLVANIA)
- ESTIMATED AWARD DATE:

133 — AUCTION RULES     EDIT SECTION

- EXTENDED BIDDING: IF A SUPPLIER PLACES A BID THAT IS IN FIRST POSITION OR BETTER IN THE LAST 5 MINUTE(S) BEFORE THE CLOSING OF THE LOT, EXTEND THE CLOSING TIME OF THAT LOT BY 5 MINUTE(S).
- TIE BIDS: A SUPPLIER CANNOT SUBMIT MATCHING BIDS.
- BID DECREMENT: THE AMOUNT A BID IS LOWERED SHOULD BE BASED ON PERCENTAGE.
- SUPPLIER FEEDBACK: RANK ~ NO PRICE FEEDBACK
- STARTING GATE: NO STARTING GATE ENABLED

134 — GENERAL COMMERCIAL TERMS     EDIT SECTION

- CONTRACT DURATION: TWO YEARS
- ESTIMATED CONTRACT START DATE: 07/11/2003
- CURRENCY: US DOLLAR (USD)
- PAYMENT TERMS: NET 30 — 135

136 — LOTS AND DOCUMENTS

◀ PREVIOUS 2 LOTS     LOTS 1 TO 2 OF 2     NEXT 2 LOTS ▶

1 WINTER CAPS DETAILS
- LOT NUMBER: 1
- LOT TITLE: WINTER CAPS — 137
- LOT DESCRIPTION: HATS FOR WEARING WHEN THE WEATHER IS COLD
- ESTIMATED TOTAL QUANTITY: 1,000 CAPS PER QUARTER
- MINIMUM RELEASE QUANTITY:
- DELIVERY LOCATION:
- SHIPPING TERMS:
- BID PRICING: PIECE PART/UNIT PRICE
- RESERVE PRICE:
- STARTING PRICE:
- HISTORIC PRICE: 1,000.00 (USD)
- BID DECREMENT: 0.5%

2 SUMMER HATS DETAILS
- LOT NUMBER: 2
- LOT TITLE: SUMMER HATS — 138
- LOT DESCRIPTION: HATS TO PROTECT FROM THE SUN
- ESTIMATED TOTAL QUANTITY: 1,000 HATS PER QUARTER
- MINIMUM RELEASE QUANTITY:
- DELIVERY LOCATION:
- SHIPPING TERMS:
- BID PRICING: PIECE PART/UNIT PRICE
- RESERVE PRICE:
- STARTING PRICE:
- HISTORIC PRICE: 1,000.00 (USD)
- BID DECREMENT: 0.5%

◀ PREVIOUS 2 LOTS     LOTS 1 TO 2 OF 2     NEXT 2 LOTS ▶

LOT LIST — 150

CLICK THE LOT ACTIONS FOR MORE DETAILS.

| LOT NUMBER | LOT TITLE | DESCRIPTION | STARTING PRICE | ACTION(S) |
|---|---|---|---|---|
| 1 | WINTER CAPS | HATS FOR WEARING WHEN THE WEATHER IS COLD | NONE | VIEW ACCEPT DECLINE |
| 2 | SUMMER HATS | HATS TO PROTECT FROM THE SUN | NONE | VIEW ACCEPT DECLINE |

FIG. 5

LOSLISTE — 160

KLICKEN SIE AUF DIE LOSAKTIONEN, UM WELTERE INFORMATIONEN ZU ERHALTEN.

| LOSNUMMER | LOSTITEL | BESCHRELBUNG | ANFENGSPREIS | OPTION(EN) |
|---|---|---|---|---|
| 1 | WINTER-KAPPEN | HÜTE FÜR DAS TRAGEN, WENN DAS WETTER KALL LST | KEIN | ANZEIGEN ANNEHMEN ABLEHNEN |
| 2 | SOMMER-HÜTE | VOR DER SONNE ZU SCHÜTZEN HÜTE, SICH | KEIN | ANZEIGEN ANNEHMEN ABLEHNEN |

FIG. 6

ELENCO DEL LOTTI — 170

PER MAGGIORI DETTAGLI CLICCARE SUITE AZIONI DEL LOTTO.

| NUMERO DEL LOTTO | NOME DEL LOTTO | DESCRIZIONE | PREZZO INIZIALE | AZIONI |
|---|---|---|---|---|
| 1 | WINTER CAPS | HATS FOR WEARING WHEN THE WEATHER IS COLD | NESSUNO | VISUALIZZA ACCETTA RIFIUTE |
| 2 | SUMMER HATS | HATS TO PROTECT FROM THE SUN | NESSUNO | VISUALIZZA ACCETTA RIFIUTE |

FIG. 7

TRANSLATION TECHNOLOGY IN ELECTRONIC SOURCING

FIELD OF THE INVENTION

The invention relates generally to conducting online electronic auctions, and in particular, using translation technology in electronic sourcing.

BACKGROUND OF THE INVENTION

Electronic sourcing management processes for products and services have been developed. Network systems communicate with users during many different phases of the management process. Since many users sometimes communicate in different languages, it is desirable to communicate with them in as many different languages as possible so that the electronic sourcing will be successful.

It is believed that in present online auctions, systems allow management of electronic sourcing only in one language. These systems may even render no information if a desired language is unavailable. In systems with only one language, a target supplier base may be limited because some suppliers may not be able to understand the information presented to them and thus, are unable to adequately participate in the sourcing process. Consequently, competition is diminished and a less efficient market will result.

SUMMARY OF THE INVENTION

The invention provides a method for effective communication in a network. This method includes obtaining from an editor data in a first language, accepting from the editor at least one allowable language other than the first language, receiving a request from a reader to access the data in a second language, if the second language is the at least one allowable language, rendering a version of the data in the second language to the reader, and if the second language is not the at least one allowable language, providing the data to the reader in the first language.

The invention also provides a method for effective communication in an electronic auction. This method includes providing to an editor a template to receive fields and data related to the auction in a first language, accepting the fields and data from the editor in the first language and any additional languages provided by the editor, receiving from a reader a language choice to view the fields and data, if the language choice is the first language, displaying the fields and the data in the first language, if the language choice is the second language, displaying the fields in the second language and the data in the first language and if the language choice is a third language, displaying the fields in at least one of the first and second languages and the data in the first language.

The invention further provides a system for effective communication in a network. This method includes a first database for receiving and storing text in a plurality of languages, a second database for receiving and storing data in a plurality of languages, and at least one processor for providing to an editor the fields in a base language chosen by the sponsor, accepting the data from the editor in the base language and any additional languages provided by the editor, receiving from a reader at least one chosen language to view the fields and data, and displaying the fields and data in at least one of the chosen language and the base language.

The invention also provides a computer system operatively connected to a network for facilitating communication over a network. This system includes means for providing to an editor fields in a first language to receive data, where the fields are available in at least a second language, means for accepting the data from the editor in the first language and any additional languages provided by the editor, means for receiving from a reader a language choice to view the fields and data, means for determining if the language choice is one of the first language, the second language and a third language, means for displaying the fields and the data in at least one of the first language, second language, and third language based upon the determination.

The invention further provides a machine readable medium for rendering data in different languages. The medium includes a first machine readable code that provides to an editor fields in a first language to receive data, where the fields are available in at least a second language, a second machine readable code for accepting the data from the editor in the first language and any additional languages provided by the editor, a third machine readable code for receiving from the reader a language choice to view the fields and data, a fourth machine readable code for determining if the language choice is the first language, the second language and a third language, a fifth machine readable code for displaying the fields and the data in at least one of the first language, second language, and third language based upon the determination.

BRIEF DESCRIPTION OF THE DRAWINGS

The accompanying drawings, which are incorporated herein and constitute a part of this specification, illustrate the presently preferred embodiments of the invention and, together with the general description given above and the detailed description given below, serve to explain the features of the invention.

In the drawings:

FIG. 3D illustrates yet another exemplary user interface display for an editor;

FIG. 5 illustrates an exemplary user interface display for a reader;

FIG. 6 illustrates another exemplary user interface display for a reader;

FIG. 7 illustrates yet another exemplary user interface display for a reader;

DETAILED DESCRIPTION OF THE PREFERRED EMBODIMENTS

Reference will now be made in detail to the preferred embodiments of the present invention, examples of which are illustrated in the accompanying drawings. It is to be understood that the Figures and descriptions of the present invention included herein illustrate and describe elements that are of particular relevance to the present invention, while eliminating, for purposes of clarity, other elements found in typical auction systems and computer networks.

The invention provides a multi-lingual online environment in electronic sourcing. The method and system are particularly applicable to online auctions for global markets. The method and system allow editors and readers to communicate with each other and the network in their desired languages.

The following description of the features of the present invention is presented in the context of downward-based online industrial auctions. However, as would be appreciated by one of ordinary skill in the relevant art, these inventive features could also be applied in the context of any electronic sourcing event and any communications via a network.

Figure 1A:
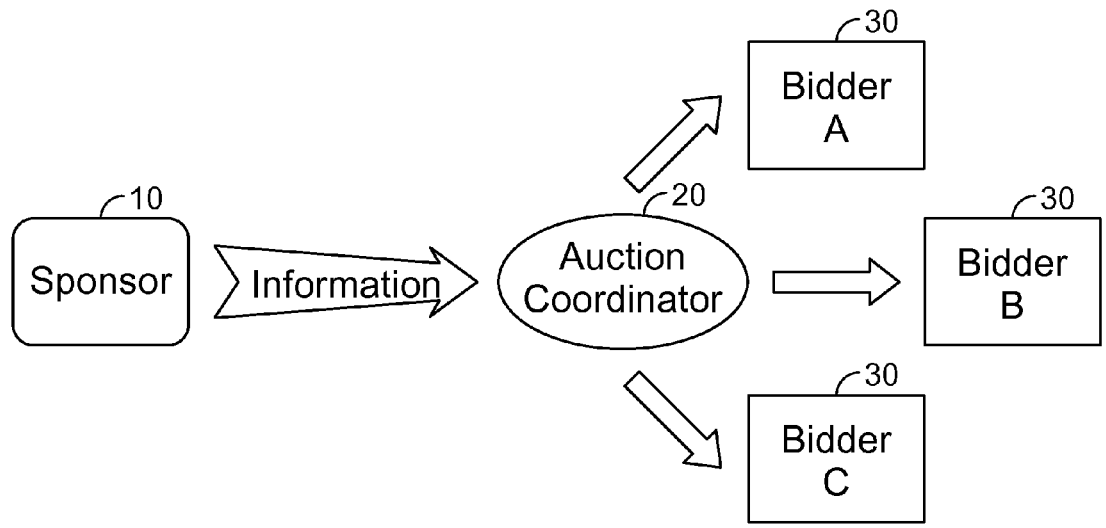
FIG. 1A is a flow diagram of a request for quotation in an auction.
Figure 1B:
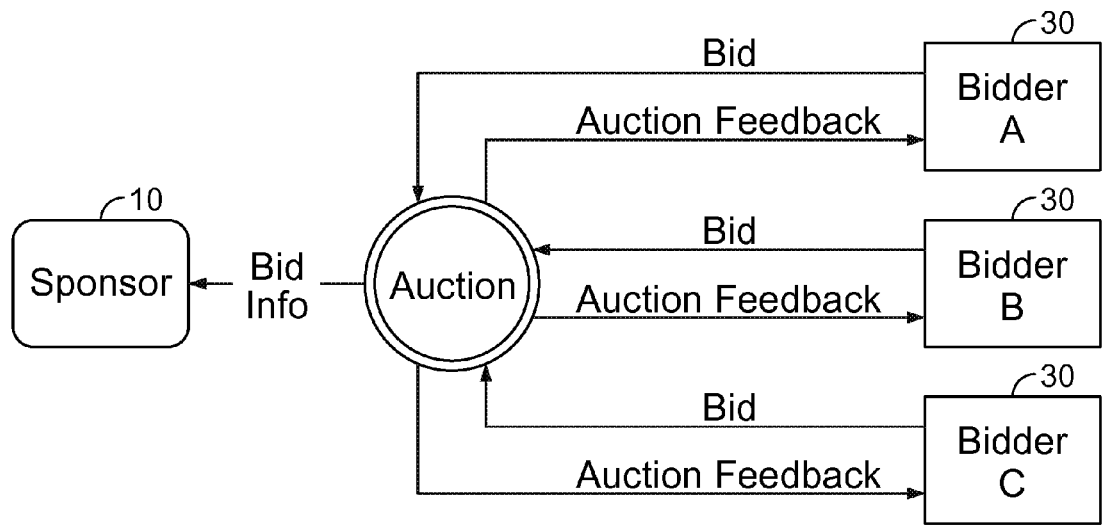
FIG. 1B is a flow diagram of a bidding process in an auction.
Figure 1C:
FIG. 1C is a flow diagram of a contract award following an auction.

The basic process for a purchaser sponsored supplier-bidding or reverse auction, as conducted by the assignee of the present invention, is described below with reference to FIG. 1. FIG. 1 illustrates the functional elements and entities involved in setting up and conducting a typical supplier-bidding auction. FIG. 1A illustrates the creation of an auctioning event, FIG. 1B illustrates the bidding during an auction, and FIG. 1C illustrates results after completion of a successful auction.

In the supplier-bidding reverse auction model, the product or service to be purchased is, preferably, defined by the sponsor, or originator, 10 of the auction, as shown in FIG. 1A. Alternatively, the buyer, or user, may set up all or some of its own bidding events and find its own suppliers. The sponsor 10 could run the events through a market operations center, which is a facility where auctions are monitored and participants receive assistance, or run the events as a self-service option. Software may be provided to the sponsor 10 through a plug-in program or similar means. If the sponsor 10 decides to use the auctioning system of the present invention to procure products or services, the sponsor 10 may provide information to an auction coordinator 20. That information may include information about incumbent suppliers and historic prices paid for the products or services to be auctioned, for example. Preferably, the sponsor 10 also works with the auction coordinator 20 to define the products and services to be purchased in the auction and lot the products and services appropriately so that desired products and services can be procured using optimal auction dynamics.

Figure 2:
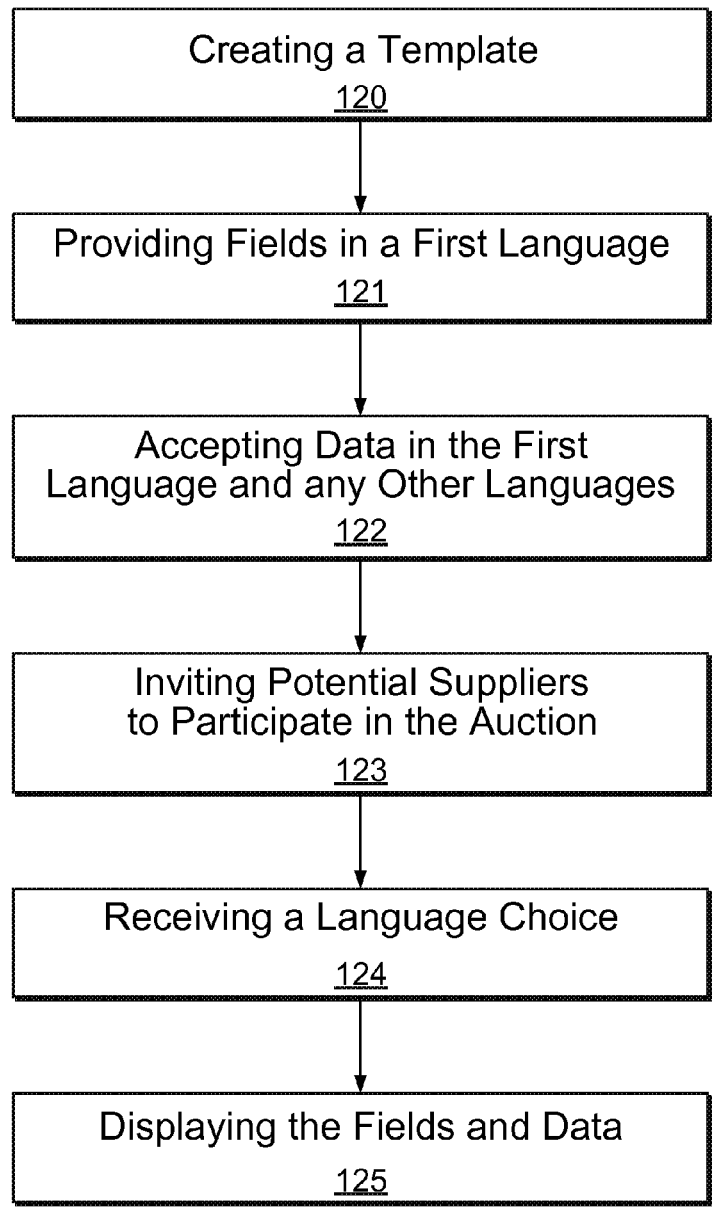
FIG. 2 is a block flow diagram of one embodiment of the method of the invention.
Figure 3A:
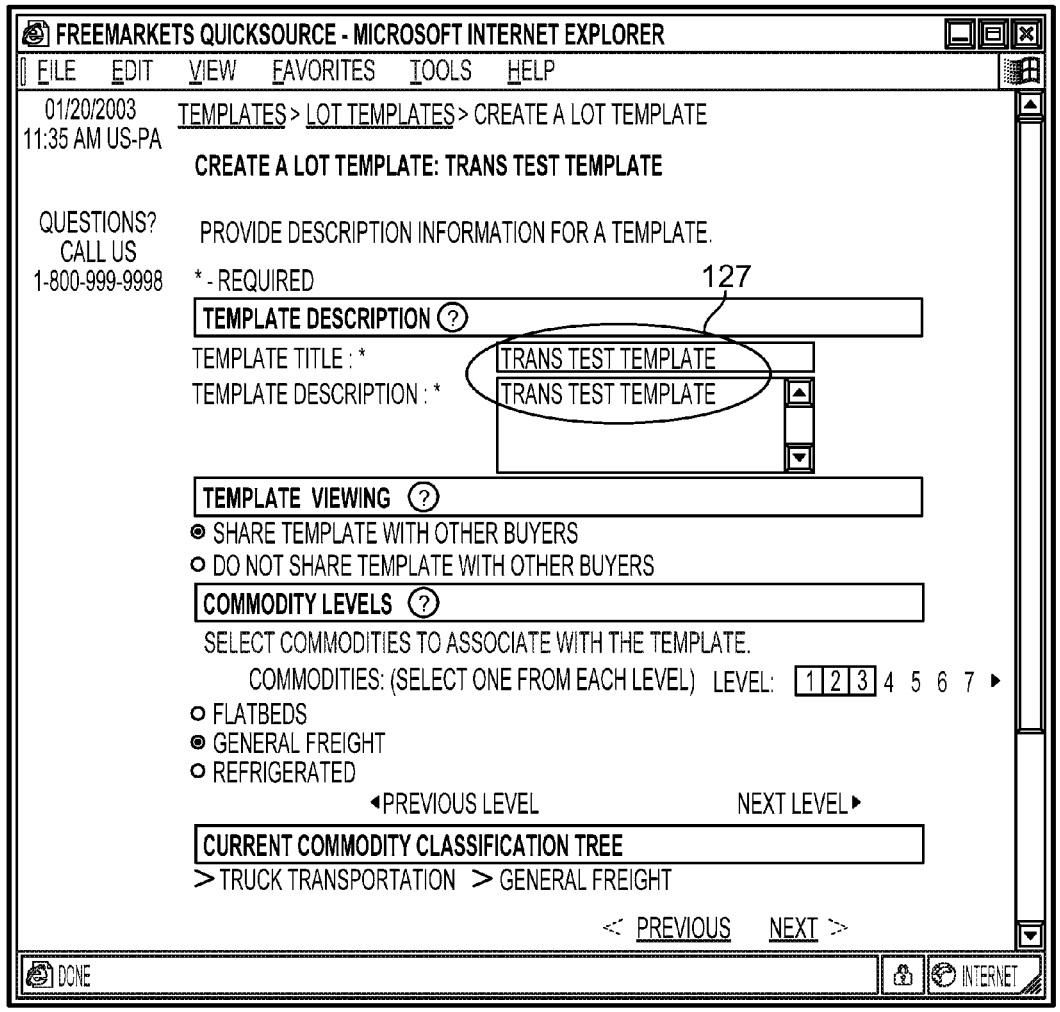
FIG. 3A illustrates an exemplary user interface display for an editor.
Figure 3B:
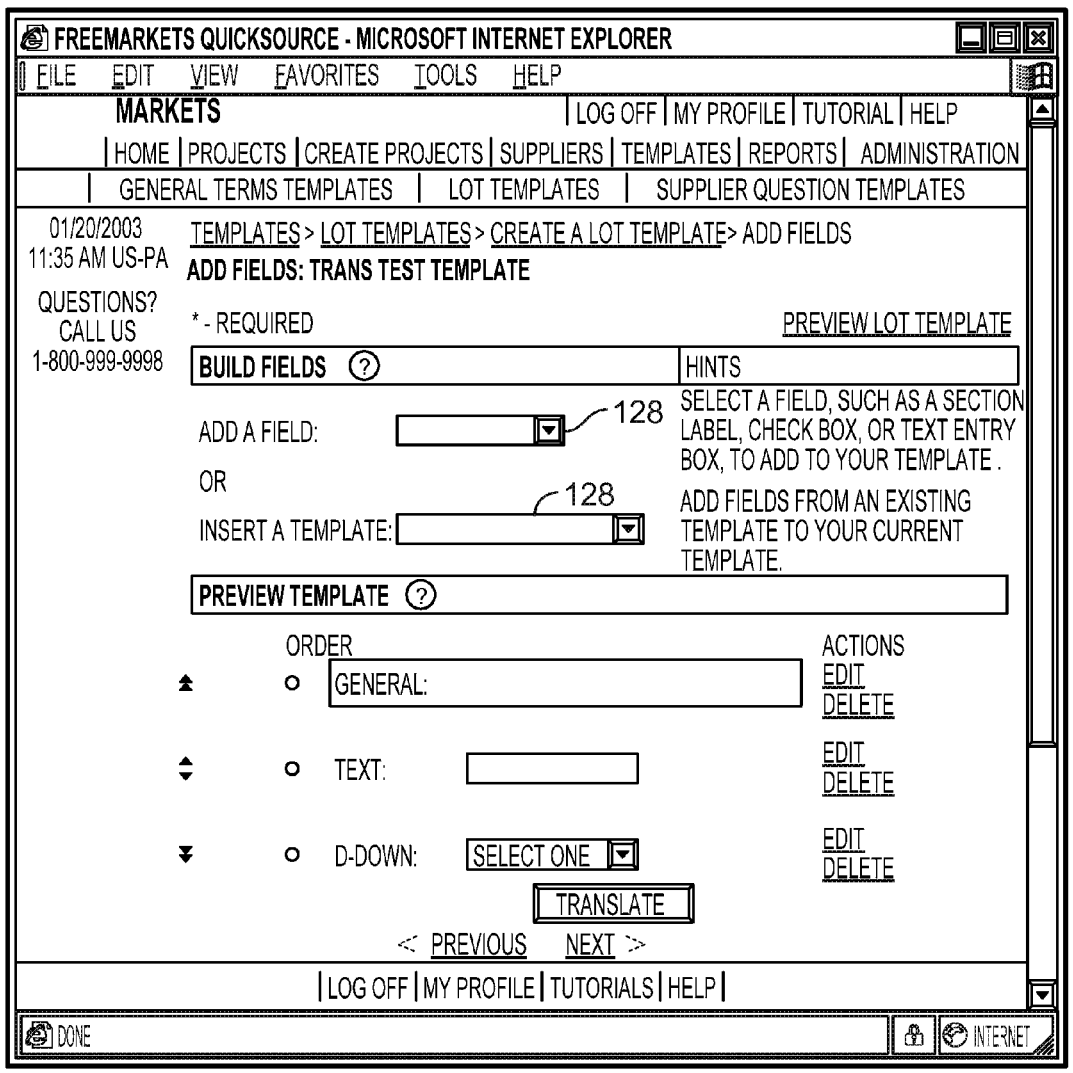
FIG. 3B illustrates another exemplary user interface display for an editor.
Figure 3C:
FIG. 3C illustrates yet another exemplary user interface display for an editor.

In any event, an editor, who may be the buyer, sponsor or originator, sets up an auction, or any other sourcing project, by providing information about the auction in a desired language. The editor preferably logs into an auction system to access a database. As shown in FIG. 2, to create a new auction, in step 120, the editor may create a template by providing descriptive information. For example, as shown in FIG. 3A, the editor manually enters text 127 to define the fields of the template and provides any other information necessary to complete the template. This text is entered in a first language, which is also known as a base language. As shown in FIG. 3B, the editor may also choose fields for the newly created template by selecting the fields from the drop-down boxes 128. These fields may be added from already existing templates or as newly created fields. The system then displays a series of fields in the first language in an organization for the editor to review. The newly created template is a reusable component of a sourcing project. These fields of information may be shown on the editor's computer screen and may also be provided as a template with headings or questions. Once the fields are created in the base language, the editor may then be prompted to enter translations for the dynamic text in the fields entered in the base language. For example, as shown in FIG. 3C, the editor may want the field, "General" in the base language of English to also be available in Spanish, so the editor would enter the Spanish translation of "General" in box 129. The resulting template may be used for Requests for Quotation ("RFQ"), Requests for Information ("RFI"), Requests for Proposals ("RFP"), collectively known as RFx, and posting translation as discrete types of projects.

The editor then enters the data, which may be manually entered in text strings, in the base language. The text strings may be descriptions, details, numbers, desired bidders, answers to questions or any other information. These text strings may be presented to the editor in a fillable blank text box. In one aspect of the invention, the choice of language is indicated at the time the editor creates the auction. In another aspect of the invention, the choice of language has already been stored in the editor's profile based on earlier transactions. This profile may contain more than one language preference and a ranking of those preferences, where the language provided in the fields is the highest ranked language available in the system.

An example of a display having auction data is shown in FIG. 3D. Screen 130, which functions as a review page for the user to confirm the data entered, displays auction details 131 for the auction, such as auction title and description 132, "A second auction for hats" and "Various types of hats and caps," auction rules 133, general commercial terms 134, such as payment terms 135 being "Net 30," lots and documents 136, such as lot title and lot description 137 being "Winter Caps" and "Hats for wearing when the weather is cold," and lot title and description 138 being "Summer Hats" and "Hats to protect from the sun." In this example, the base language is English, so the fields and data are shown in English.

Figure 4:
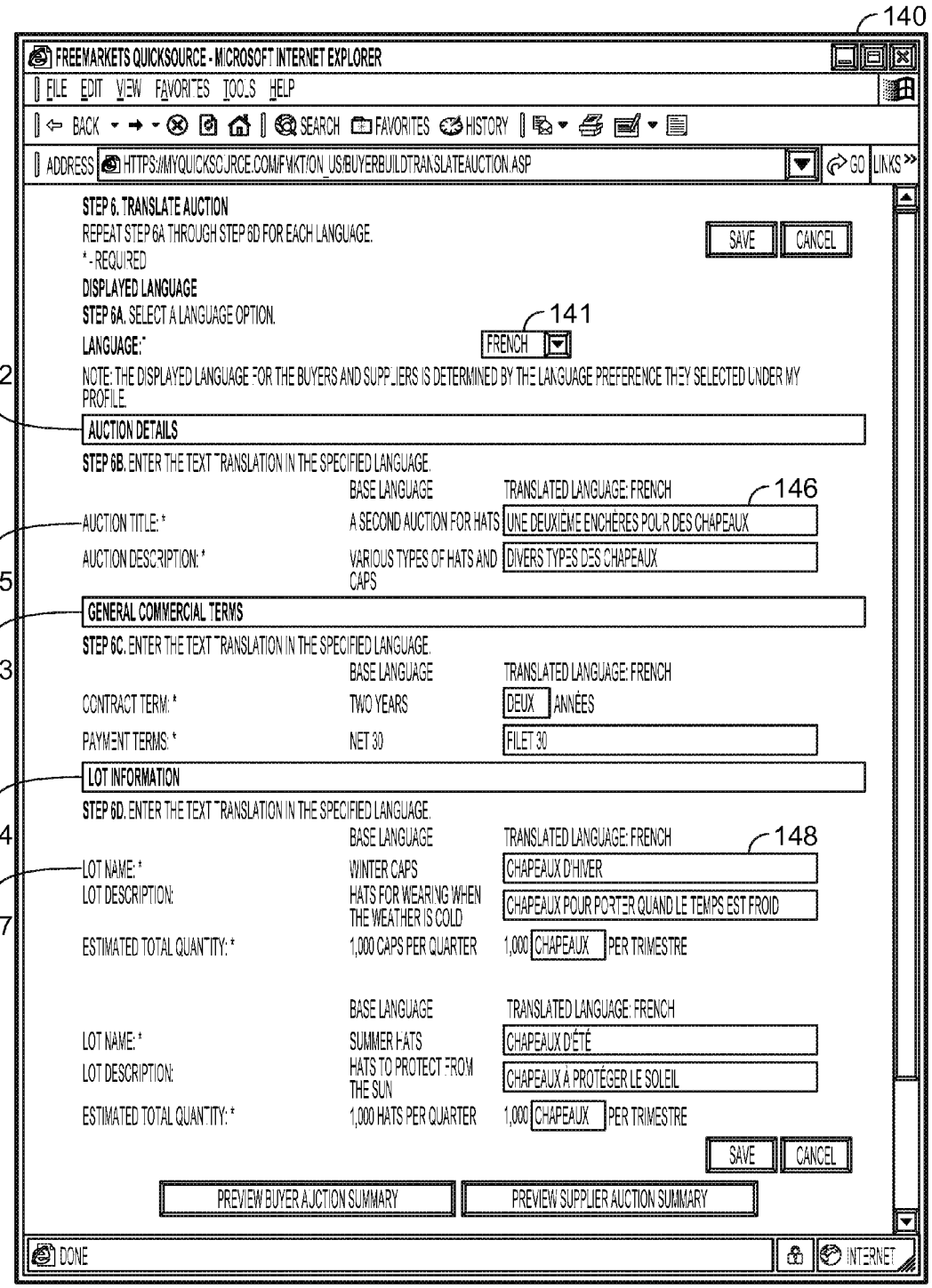
FIG. 4 illustrates yet another exemplary user interface display for an editor.

The editor then has the option to re-enter the data in additional languages, such as French, German, Spanish, etc. . . . In one aspect of the invention, the user views what was entered in the base language and re-enters the data in additional languages in fillable text boxes. For example, in screen 140, shown in FIG. 4, if an editor chooses French as another language in a drop down box of available languages 141, the auction details 142, general commercial terms 143, and lot information 144 will be displayed in the base language of English with text boxes for the French translations. In this example, the auction title 145 has text in a base language of English, "A second auction for hats," that corresponds to the French text entered in the text box 146, "Une deuxième enchère pour des chapeaux." Similarly, the lot name 147 has text in the base language of English, "Winter Caps," that corresponds to the French text entered in text box 148, "Chapeaux D'Hiver." The editor may obtain the translations of the original data from any source, including translation programs, such as those available on the Internet, and publications. The editor continues to choose languages and re-enter the data for each chosen language.

In another aspect of the invention, the editor enters all data in all different allowable languages at one time. This method is preferred if the data has a relational structure, such as a tree and in particular, a commodity tree.

In accordance with FIG. 2, when the editor enters the data, or details, in the base language and any additional languages, the system accepts this data in step 122 and stores it in a database associated with the auction the editor has created. The data that does not need to be translated, such as numbers, dates, and taxonomy selections like radio button or check box inputs, that may be separated from the other data by the system to reduce its workload. A specification may then be prepared for each desired product or service, and a RFQ may be generated for the auction. Next, the auction coordinator 20 may identify potential suppliers, or potential bidders, 30, preferably with input from the sponsor 10, and invite the potential suppliers 30 to participate in the upcoming auction in step 123. These potential suppliers 30 are the readers of the data. The editor may also be a reader of the data. In one aspect of the invention, the invitations are sent via e-mail and contain details about the auction and/or how to access details about the auction. Each invitation may be in the base language or a preferred language stored in a profile already created by the potential supplier 30. Similar to the editor's profile described above, there may be more than one language preferred of which may be ranked in order of preference. In this case, the invitation will be provided in the most preferred language available.

The suppliers 30 that are selected to participate in the auction may become bidders 30 and may be given access to the RFQ, typically through an RFQ in a tangible form, such as on paper or in an electronic format. Access to the system may be achieved via logging in with a user name and password or any other means. The potential supplier 30, or reader, will then indicate his or her language choice or choices, which may be done by the system accessing the reader's preferences or inquiring directly. The preferred language may be chosen by entering it manually or clicking on a language in a drop-down menu. In the drop-down menu, the base language may be indicated as the first language in a list of languages. When the system receives the language choice in step 124, the auction information, including the fields and data, which were provided by the editor, are displayed in step 125. If the language choice is the base language, the auction information is displayed in the base language. For example, in FIG. 5, the base language and language choice are both English, so the display of the lot list 150 is in English. Similarly, if the language choice is one of the languages already entered by the editor, the auction information and data are displayed in the chosen language. For example, in FIG. 6, the language choice and an allowable language, which was entered by the editor, are French, so the display of the lot list 160, or "losliste" in this case, is in French.

If the language choice is not the base language or any other allowable language entered by the user, the display of the lot list will be in the base language, where if the base language is English, the display would be the same as that shown in FIG. 5. However, if the system is able to provide its information, or fields and/or boiler plate text, in the language choice, those fields and/or boiler plate text may be displayed according to the language choice of the reader. For example, as shown in FIG. 7, an Italian reader chooses Italian as his language choice, but Italian is not the base language of English or any of the other allowable languages. Italian is, however, a language that is available by the system to view the fields and/or boiler plate text. Therefore, the display of the lot list 170, or "Elenco dei lotti" in this case, is shown in both Italian and English. Whatever data was provided by the editor is displayed in the base language of English, while the fields, which consists of titles and instructions, are displayed in the language choice of Italian.

In another embodiment of the invention, the system provides a method for the editor to update the data in the template. For instance, if the editor updates a desired quantity in a lot before an auction begins and the data is able to be translated, the system may then notify the editor that the data in the other languages must also be updated or else only the update will be provided to the readers in the base language. This notification may occur while the editor is logged into the system or may occur via e-mail or some other type of correspondence.

After the potential suppliers 30, or readers, view the information about an auction, they are then ready to submit bids once the auction begins. As shown in FIG. 1B, during a typical auction, bids are made for lots. Bidders 30 may submit actual unit prices for all line items within a lot, however, the competition in an auction is typically based on the aggregate value bid for all line items within a lot. The aggregate value bid for a lot may, therefore, depend on the level and mix of line item bids and the quantity of goods or services that are offered for each line item. Thus, bidders 30 submitting bids at the line item level may actually be competing on the lot level. During the auction, the sponsor 10 may monitor the bidding as it occurs.

After the auction, the auction coordinator 20 may analyze the auction results with the sponsor 10. The sponsor 10 may conduct final qualification of the low bidding supplier or suppliers 30. The sponsor 10 may furthermore retain the right not to award business to a low bidding supplier 30 based on final qualification or other business concerns. As shown in FIG. 1C, a supply contract may be drawn up for the winning bidder 30 and executed based on the results of the auction.

The auction may be conducted electronically between bidders 30 at their respective remote sites and the auction coordinator 20 at its site. Alternatively, instead of the auction coordinator 20 managing the auction at its site, the sponsor 10 may perform auction coordinator tasks at its site.

Figure 8:
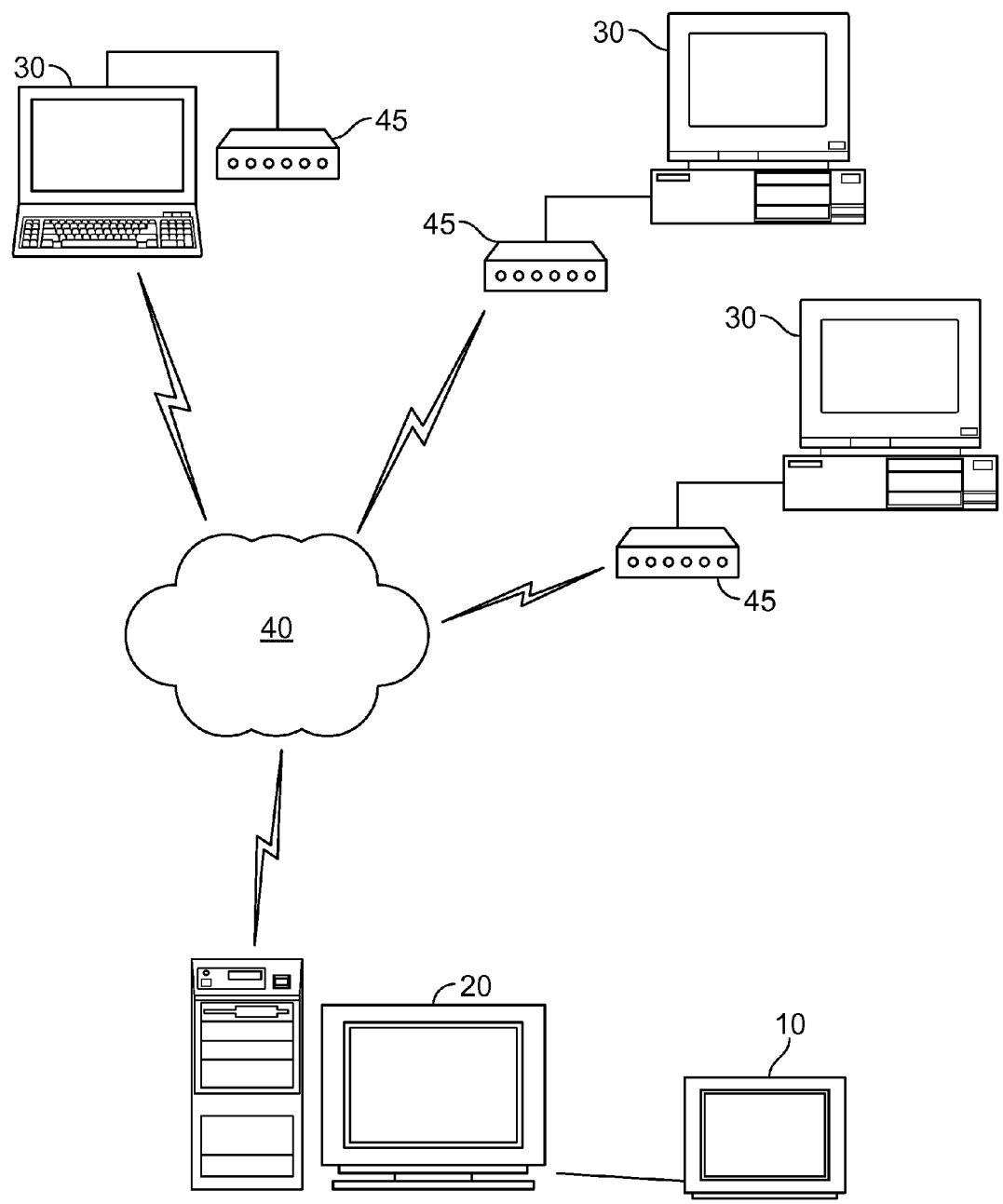
FIG. 8 is a schematic illustration of communications lines between a coordinator, a buyer, and suppliers in an auction.

Information may be conveyed between the coordinator 20 and the bidders 30 via any communications medium. As shown in FIG. 8, bidders 30 may be connected to the auction through the Internet via a global environment, such as the Internet 40. For example, using a computer system coupled to a modem 45, bidders 30 may connect to the auction via an existing dial-up telephone line. Alternatively, sponsors 10 and bidders 30 may be coupled to the auction by communicating directly with the auction coordinator 20 through a public switched telephone network, a wireless network, or any other connection.

Figure 9:
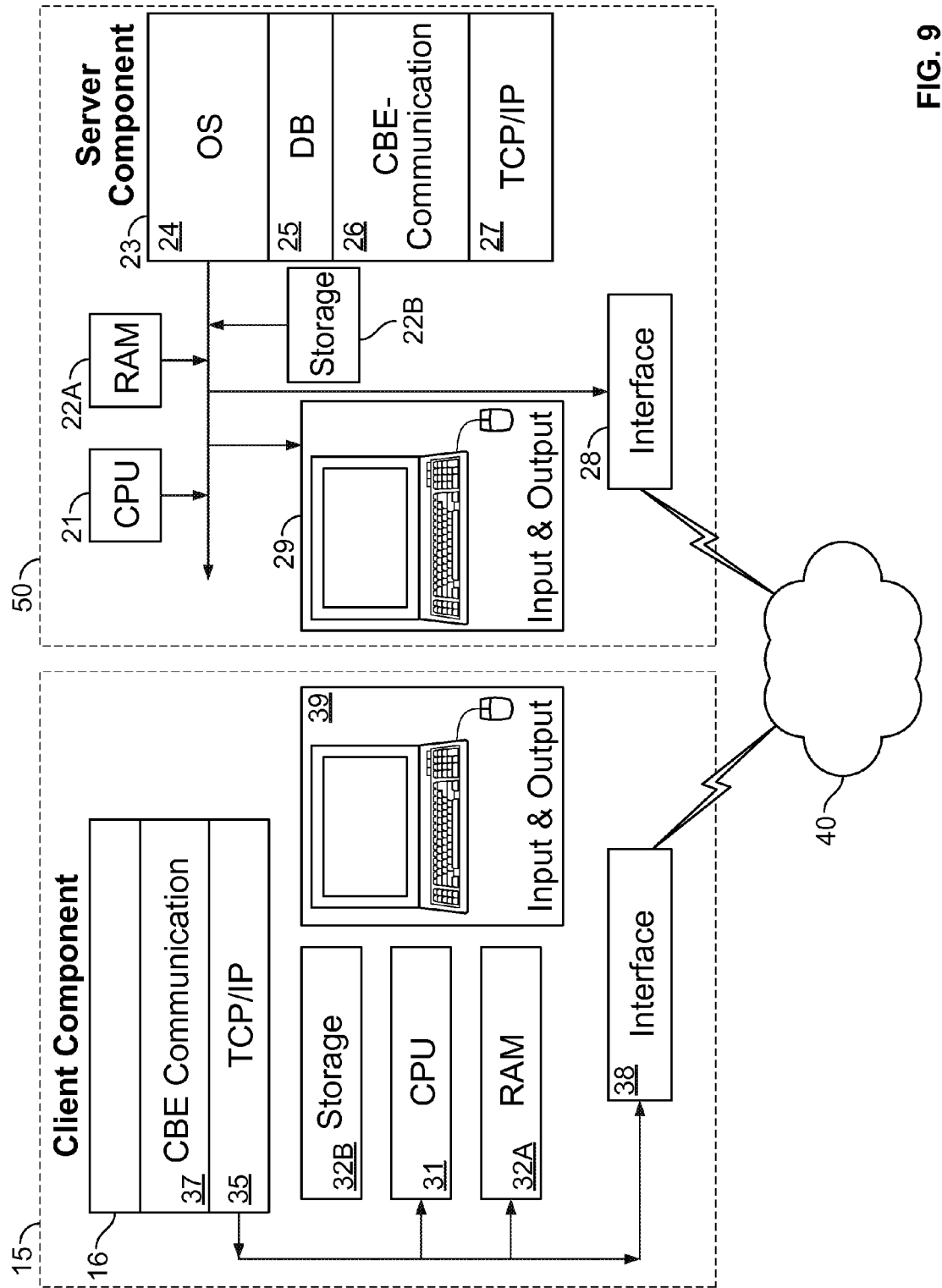
FIG. 9 is a schematic illustration of auction software and computers hosting that software in an auction.

A computer software application may be used to manage the auction. Preferably, as shown in FIG. 9, the software application has two components: a client component 16 and a server component 23. The client component 16 may operate on a computer at the site of each of the potential suppliers 30. Suppliers 30 make bids during the auction using the client component 16. The bids may be sent via the network service provider 40 to the site of the coordinator, where it is received by the server component 23 of the software application. The client component 16 may include software used to make a connection through telephone lines or the Internet to the server component 23. Bids may be submitted over this connection and updates may be sent to the connected suppliers.

Bids may only be submitted using the client component 16 of the application. This ensures that buyers do not circumvent the bidding process, and that only invited suppliers participate in the bidding. Bidders may see their bids and bids placed by other suppliers for each lot on the client component 16. When a bidder submits a bid, that bid is sent to the server component 23 and evaluated to determine whether the bid is from an authorized bidder and whether the bid has exceeded a pre-determined maximum acceptable price. Bids placed by a supplier may be broadcast to all connected bidders, thereby enabling every participating bidder to quickly view the change in market conditions and begin planning their competitive responses.

The embodiments of the invention may be implemented by a processor-based computer system. In one embodiment, the system includes a first database for receiving and storing fields in a plurality of languages, a second database for receiving and storing data in a plurality of languages, and one or more processors for providing to an editor the fields in a base language chosen by the editor, accepting the data from the editor in the base language and any additional languages provided by the editor, receiving from a reader one or more chosen languages to view the fields and data, and displaying the fields and data in one of the chosen languages and/or the base language.

In another embodiment, the system is operatively connected to a network for facilitating communication over a network and includes means for providing to an editor fields in a first language to receive data, where the fields are available in at least a second language, means for accepting the data from the editor in the first language and any additional languages provided by the editor, means for receiving from a reader a language choice to view the fields and data, means for determining if the language choice is the first language, the second language or a third language, and means for displaying the fields and the data in at the first language, second language, and/or third language based upon the determination.

As shown further in FIG. 9, in accordance with the present invention, computer system 50 operates to execute the functionality for server component 23. Computer system 50 includes a processor 21, a memory 22A and a disk storage 22B. Memory 22A stores computer program instructions and data. Processor 21 executes the program instructions or software, and processes the data stored in memory 22A. Disk storage 22B stores data to be transferred to and from memory 22A. Note that disk storage 22B can be used to store data that is typically stored in database 25.

All these elements are interconnected by one or more buses, which allow data to be intercommunicated between the elements. Note that memory 22A is accessible by processor 21 over a bus and includes an operating system, a program partition and a data partition. The program partition stores and allows execution by processor 21 of program instructions that implement the functions of each respective system described herein. The data partition is accessible by processor 21 and stores data used during the execution of program instructions.

For purposes of this application, memory 22A and disk 22B are machine readable mediums and could include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), optical fiber, electrical signals, lightwave signals, radio-frequency (RF) signals and any other device or signal that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, system 50 may contain various combinations of machine readable storage devices, which are accessible by processor 21 and which are capable of storing a combination of computer program instructions and data.

Computer system 50 also includes a network interface 28. Network interface 28 may be any suitable means for controlling communication signals between network devices using a desired set of communications protocols, services and operating procedures. Communication protocols are layered, which is also referred to as a protocol stack, as represented by operating system 24, a CBE-communication layer 26, and a Transport Control Protocol/Internet Protocol (TCP/IP) layer 27. Network interface 28 also includes connectors for connecting interface 28 with a suitable communications medium. Those skilled in the art will understand that network interface 28 may receive communication signals over any suitable medium such as twisted-pair wire, co-axial cable, fiber optics, radio-frequencies, and so forth.

FIG. 9 further shows another computer system 15 that operates to execute the functionality for client component 16. Computer system 15 includes a processor 31, a memory 32A, disk storage 32B, a network interface 38, and a protocol stack having a CBE-communication layer 37 and a TCP/IP layer 35. These elements operate in a manner similar to the corresponding elements for computer system 50.

Another embodiment of the invention includes a machine readable medium for rendering data in different languages. This medium includes a first machine readable code that provides to an editor fields in a first language to receive data, where the fields are available in at least a second language, a second machine readable code for accepting the data from the editor in the first language and any additional languages provided by the editor, a third machine readable code for receiving from a reader a language choice to view the fields and data, a fourth machine readable code for determining if the language choice is the first language, the second language or a third language, a fifth machine readable code for displaying the fields and the data in the first language, second language, and/or third language based upon the determination.

While the invention has been described in detail and with reference to specific embodiments thereof, it will be apparent to one skilled in the art that various changes and modifications can be made therein without departing from the spirit and scope thereof. For example, although the invention is described in the context of online auctions, it may be applied to any communications over a network. Thus, it is intended that the present invention covers the modifications and variations of this invention provided they come within the scope of the appended claims and their equivalents.

What is claimed is:

1. A method comprising:
   determining that a first reader has an associated language choice comprising a first language;
   receiving a request from the first reader to access data in the first language;
   determining, using a processor, that the data is available in a second language and is not available in the first language; and
   rendering the data in the second language to the first reader and rendering a field descriptive of the data in the first language.

2. The method of claim 1 further comprising obtaining the data in the second language from an editor.

3. The method of claim 1 wherein the data comprises at least one of a description, commercial terms, lot details, and desired bidders.

4. The method of claim 1 further comprising:
   choosing bidders to participate in an auction;
   sending invitations to the chosen bidders;
   accepting a chosen language from each invited bidder; and allowing each invited bidder to access the data in at least one of the chosen language and the second language.

5. The method of claim 1 wherein the language choice further comprises a third language.

6. The method of claim 1 further comprising:
receiving a data edit from an editor; and notify the editor to update corresponding data in a third language.

7. The method of claim 1 further comprising:
providing to an editor a template to receive the in at least the second language.

8. The method of claim 1 further comprising receiving a request from a second reader to access the data in the second language and rendering the data and the field in the second language.

9. A system comprising:
a database comprising data in a plurality of languages; and
at least one processor configured to:
determine that a first reader has an associated language choice comprising a first language;
receive a request from the first reader to access data in the first language;
determine that the data is available, in the database, in a second language and is not available in the first language; and
render the data in the second language to the first reader and render a field descriptive of the data in the first language.

10. The system of claim 9 wherein the processor is further configured to obtain the data in the second language from an editor.

11. The system of claim 9 wherein the data comprises at least one of a description, commercial terms, lot details, and desired bidders.

12. The system of claim 9 wherein the language choice further comprises a third language.

13. The system of claim 9 wherein the processor is further configured to receive a data edit from an editor and notify the editor to update corresponding data in a third language.

14. A computer program product embodied in a non-transitory computer readable storage medium and comprising computer instructions for:
determining that a first reader has an associated language choice comprising a first language;
receiving a request from the first reader to access data in the first language;
determining that the data is available in a second language and is not available in the first language; and
rendering the data in the second language and rendering a field descriptive of the data in the first language.

15. The computer program product of claim 14 further comprising computer instructions for obtaining the data in the second language from an editor.

16. The computer program product of claim 14 wherein the data comprises at least one of a description, commercial terms, lot details, and desired bidders.

17. The computer program product of claim 14 wherein the language choice further comprises a third language.

18. The computer program product of claim 14 further comprising computer instructions for receiving a data edit from an editor and notifying the editor to update corresponding data in a third language.

* * * * *